United States Patent Office 3,337,395
Patented Aug. 22, 1967

3,337,395
TERMITE CONTROL BY INDUCED EPIZOOTICS
OF ENTOMOPHAGOUS MICROORGANISMS
Robert Z. Page, 7117 Kerr Drive,
Springfield, Va. 22150
No Drawing. Filed Dec. 27, 1963, Ser. No. 334,054
2 Claims. (Cl. 167—13)

The invention described herein may be manufactured and used by or for the Government of the United States of America for governmental purposes without the payment of any royalties thereon or therefor.

This invention relates to a method of biological control of detrimental and pestiferous insects, and more particularly, to a method of inducing epizootics that result in disease epidemics in insects.

The concept of biological warfare against insects has been tested at various times, and many natural enemies and parasites have been introduced in the natural habitats of pest insects. Two instances may be cited in which bacteria have been responsible for insect mortalities. The spores of *Bacillus popilliae*, the causative agent of the milky spore disease, have been released in the field and applied to the soil for the purpose of controlling the Japanese beetle. Spores of *Bacillus thuringiensis* have also been used against the larvae of lepidopterous pests. Except for these specific bacterial pathogens, previous efforts to cause disease epidemics in insects have not been very encouraging. Bacteria injected into insect tissue will multiply rapidly and cause septicemia. It was soon discovered, however, that bacterial infections did not result when the insect ingested the bacteria with the food.

More than fifty fungus disease of insects have also been known. Most of these can be grown in the laboratory, but it has not yet proved possible to induce epizootics with such cultivated material. Artificial propagation and spread of fungus disease in the field has seldom reached epidemic proportions and has not been relied upon as a control measure principally because of such factors as weather conditions, variable susceptibility of the pest host or the variable virulence among races of spore-forming fungi.

Chemical compounds which are both toxic or repellant to insects have been extensively used and have become the general practice for insect control. However, the widespread use of highly toxic insecticides introduces a harmful residual effect in agricultural products and also destroys many beneficial forms of life. The application of household insecticides, for practical effective control, requires repetitive effort to introduce and maintain active chemicals in places where they will do the most good. The degradation and toxicity of chemicals points more and more to the need for specialized knowledge and training in applying chemical insecticides and providing adequate insect control in the home.

The present invention involves the purposeful introduction of entomophagous fungi and certain bacteria into areas which have become contaminated by or which are susceptible to insect colonies, such as termites, cockroaches, silverfish, booklice, clothes moths, carpet beetles, ants, water bugs, etc. The method of the present invention provides for insect control by deliberately fostering disease epidemics by combinations of fungi and bacteria which are shown to be lethal and more effective than with either organism alone. The combinations of the present invention produce disease more readily within groups of insects, disease which is communicated from infected individuals to a healthy group. Moreover, the presence of the combined organisms where the insects have died render the area uninhabitable to other susceptible insects. The present invention is particularly effective against insect species which have become almost domesticated, as they are found almost universally in human habitation. The invention is described with reference to termites and roaches, as these are among the most formidable as well as persistent forms of insect life that plague the present day home.

In accordance with the invention, species of bacteria and fungi which are spore-formers or which can be made into artificial spores which have been found to be non-pathogenic to human life are utilized ecologically within regions frequented by certain pestiferous insects. The combined use of certain fungi and specific bacteria can achieve a pathogenic and fatal effect on the insect host where the single organism alone is ineffective or not sufficiently pathogenic. In cases of insect death caused by infectious disease, the final stage preceding death is often a generalized septicemia caused by one or more species of bacteria. These bacteria are not necessarily the primary cause of the disease, but they may be secondary invaders. The insect, weakened by a primary invader may then be destroyed by the secondary. It may also be inferred that an insect fighting both a primary and a secondary invader may be more readily overcome by the primary invader due to the rapid multiplication of the secondary.

The effective combination of fungi and bacteria is formed of (1) bacteria which multiply rapidly on living insect tissue and often produce endotoxins and (2) fungi which are known to be pathogenic for some insects. Suitable bacteria are for the most part bacilli that form resistant spores and that can survive environmental conditions for long periods. Examples of this type are the *B. lutzae, B. thuringiensis, B. lentimorbus, B. mycoides* (in particular *B. cereus; Serratio rosea*). Bacteria which do not normally form spores of the families, Enterobacteriaceae and Pseudomonadaceae, can be provided as artificial spores by encapsulating individual bacterial cells in gelatin. An example of a suitable organism of this type is *Serratia marcescens*. The fungi selected are for the most part determined to be pathogenic for one or more species of insects but which have never been recorded as associated with human fungus disease. Fungi of this type are represented by the *Entomophthora virulenta, obscura, exitialis*, Thaxterianan; Fungi Imperfecti, *Metarrhigium anisopliae*.

Previous methods of employing spores of fungi or of bacteria for inducing disease in insects involved mixtures with inert ducts and the mixtures applied on top of the soil or on vegetation, rain washing the spores into the ground. The present spore combinations are employed as additives in particle boards, pressed fiber board, chipped boards, paper boards, packaged or inserted into structural materials containing therein animal or vegetable fibers, cellulose material, reconstituted wood and the like. The addition of the spores to the fibrous flock suspension during the later stages of processing provides structural materials that contain in their composition the combined spores of a fungus and a bacteria of the type disclosed above. The fungus-bacterial spores may also be used with dissolved or suspended attractants for the treatment of paper, cords, cloth and other fibrous material. The two principal methods of utilizing the spore combinations are:

(1) For termites, carpenter ants, Lyctidae beetles, and the like which eat or bore into cellulose, the spores are added to flock suspensions during the latter stages of processing so that the spores are enmeshed within the flock at the time of screening and pressing into particle boards, etc.

(2) For use with other domesticated insects, paper, tape, ribbon, cardboard, confetti paper, bait stakes, etc., it may be treated by dipping, spraying or brushing a suspension of spores. The suspension may contain attractants for such insects as flies, silverfish, booklice, carpet beetles, cloth moths, etc. The suspension may include adhesives to prevent loss of spores during normal handling.

The treated materials may be exposed in locations where they are contacted by insects. Short sections of paper or of cord may be placed behind baseboards, in cupboards around sinks and other places frequented by cockroaches. Cords or paper strips may be used as fly roosts in usual roosting sites, in food preparation and serving areas. With suitable attractants and adhesive backing, the treated paper may be formed in a wide variety of color and patterns to be used in various locations. Control of silverfish and booklice may be obtained by placing paper strips, or scattering confetti paper containing the spores; behind books on shelves or in packing cases and in other locations frequented by these insects. Control of cloth moths and carpet beetles may be obtained by using materials naturally attractive to the larvae of these insects, materials such as woolens cloth or felt. These materials may be formed into strips and placed under carpets, in overstuffed furniture or hung in closets.

For the control of various insects, it is within the purview of the present invention to provide panels of various compositions and of shelving materials, linings of paper, cloth or fiber sheets, coating layers or sheets with the present spore mixtures enmeshed within the fibrous compositions. Addtionally, surface treatment of materials may advantageously contain thin film coatings which contain said spores in a surface film. The surface treatment may be effected by dipping, spraying or brushing on an aqueous plastic suspension containing spores, and said suspension may also contain synthetic or organic attractants for specific insects, such as roaches, silverfish, booklice, cloth moths, carpet beetles, in addition to organic coatings, adhesive materials, dyes, etc.

Bacteria and fungi sports may be mixed in any relative amount to produce highly fatal and contagious diseases. Preferably, the spore combination is formed in about equal amounts of fungi and bacterial spores. The effective combinations are found in the fungus order of Entomophthorales. Species of the genera Conidiobolus, Empusa, Entomophthora and Massospora are effective in combination with spore-forming bacilli, such as, *B. thuringiensis* and other bacteria, for example, the *Serratia marcescens* that are artifically formed into spots by means of encapsulation. A mixture containing equal amounts of spores of the fungus, *Conidiobus villosus* and the bacterium *Bacillus lutzae* is incorporated into panels by enmeshing, coating or impregnating structural lumber, boards, wood panels, etc., to control termites. The spore mixture may also be introduced into active termite tubes when these are evident by breaking into the tube and inserting small amounts of the spore dust. The disease induced in the individuals contacting the spores becomes epizootic in the termite colony as the fungus-bacterial organisms multiply. The cleaning habits of termites with their constant attendance on one another cause rapid spread of disease throughout the areas occupied by the colony. A termite of the worker caste feeds the young and other castes. Among the various numbers of the colony there is a constant exchange of materials (trophillaxis). The cannibalistic tendency which exists in termites, consumes the diseased members and spreads the disease throughout the colony. The induced disease is passed from termite to termite by way of the secretions of which the termites are very fond. It has been observed that a mechanism exists in termite colonies which allows each colony to adjust itself to misfortunes and depredations. The widespread inoculation with virulent disease among members of the colony completely disrupts the termite colony resulting in complete destruction. A colony containing about 50 vigorous workers, nymphs and soldiers of subterranean termites was contaminated with a small amount of spore mixture of *Entomophthora virulenta* and *Bacillus thuringiensis.* The inoculated colony was kept under the same conditions as several other control colonies of similar size. Within 4 days the colony was reduced by deaths to three listless members, which later died.

Similar results were obtained with a colony of 50 vigorous termites *Reticulitermes flavipes* populated with workers, nymphs and soldiers into which a mixture of fungus and bacteria spores was introduced via their available food supply. Small wood pulp panels impregnated with the spores of *Metarrhizium anisopliae* and *Serratia marcescens* were placed within the confines of the colony. Control colonies of 50 termites each were formed and kept in separate containers and under identical conditions, except that the wood pulp panels in the control colonies did not contain fungi or bacterial spores. All the termites that were exposed to the spores were killed within 6 days, whereas most of the termites in the control colonies remained alive after 3½ months.

In a 13-day test period, German cockroaches—*Blattella germanica*—were maintained in containers with food-coated moist paper. Spore combinations of *Entomophthora obscura* with *Serratia marcescens,* and *Entomorphthora virulenta* with *B. thuringiensis* were introduced in certain containers, while in other containers either bacterial or fungus spores were added singly. The above combinations proved effective and were quickly lethal, whereas the introduction of a single organism produced negligible results.

As mentioned previously, the bacteria employed for purposes of the present invention are normally spore-formers although *Serratia marcescens* is normally without spores. It has also been stated earlier in the specification that cultures without spore formations can be encapsulated in gelatin to provide an artificial type of spore. Live cultures of these bacteria are initially treated for 20–45 hours @ 20–38° C. with an oxygen-rich atmosphere which is introduced through the medium at a rate of ⅓ to 3 liters/sec. per liter of culture medium. The medium is then centrifuged to remove the cell organisms, which are then emulsified with a solution of 3–10% gelatin and also containing cellulose, sugar and malt extract. The emulsion is spray-dried @ 100–200° C. to form individually encapsulated living cells that exist for long periods in a more or less suspended state The coated cell is readily activated by loosening the gelatin coating under proper environmental conditions of moisture and temperature.

Termite control by the present method involves the use of dusts and liquid suspensions of spores of entomophagous microorganisms in such a way as to induce epizootics in existing termite colonies and to prevent the development of new colonies. Introduction of a relatively small amount of dust formulations of the present spores induce disease in individuals contacting the spores. The disease becomes epizootic in the colony as the organisms multiply and spreads rapidly throughout the area. Individual insects which become infected with either the fungus or the bacteria will then transmit it to other diseased individuals that have been infected with the other type of spore. Once the combined infections occur, a disease epidemic may spread rapidly in the entire colony.

When termite tubes are not evident, bait stakes of clean wood may be implanted in the soil around the dwelling to determine the presence and extent of termite activity. When the bait stakes are found to be infested with termites, the stake holes are treated lightly with spore dust to kill the underground dwellers.

For the preventative treatment of soil under and around buildings, dust or water suspension of fungi-bacteria spores may be added to the soil. During the construction of dwellings, a spore suspension may be used to cover the surface of the soil or coarse fill material beneath a concrete slab. The soil around the masonry piers and on both sides of the foundation walls may be treated with spores to provide a distribution of at least 10,000 spores per cubic foot to the depth of the wall footing. The combination of fungi and bacterial spores beneath and around the dwellings will make the soil uninhabitable to termites for long periods.

Thus, it may readily be seen from the foregoing that certain fungi-bacterial spore mixtures induce epizootics in insects that are useful for eliminating and preventing many types of insects. The combination of certain fungus and bacterial spores have been found to be more efficacious for insect control than the common use of a single type of spore.

It should be understood, of course, that the foregoing disclosure relates to preferred embodiments of the invention and that numerous equivalents may be resorted to by those skilled in the art without departing from the spirit and scope of the invention as set forth in the appended claims.

What is claimed is:

1. In the art of biological control of termites in which epizootic-inducing quantities of entomophagous microorganisms are placed at a site frequented by termites and where they are contacted by said termites, the improvement which comprises placing at said site spores of a fungus of the group consisting of *Entomophthora virulenta* and *Entomophthoro obscura* and spores of *Bacillus thuringiensis.*

2. In the art of biological control of termites in which epizootic-inducing quantities of entomophagous microorganisms are placed at a site frequented by termites and where they are contacted by said termites, the improvement which comprises placing at said site spores of *Entomophthora virulenta* and spores of *Bacillus thuringiensis.*

References Cited

UNITED STATES PATENTS

| | | | |
|---|---|---|---|
| 2,700,611 | 1/1955 | Jeffreys | 99—2 |
| 3,006,809 | 10/1961 | Gershon | 167—48 |
| 3,070,495 | 12/1962 | Esenther et al. | 167—48 |
| 3,086,922 | 4/1963 | Mechalis | 195—96 |
| 3,087,865 | 4/1963 | Drake et al. | 195—96 |
| 3,249,492 | 5/1966 | Lund | 167—22 |
| 3,249,493 | 5/1966 | Lund | 167—22 |
| 3,249,494 | 5/1966 | Lund | 167—22 |
| 3,249,500 | 5/1966 | Lund | 167—48 |
| 3,249,501 | 5/1966 | Lund | 167—48 |

OTHER REFERENCES

Biological Abstracts 29, #4549, #27265 (1955).

Biological Abstracts 30, #8205, #8925, #11112 (1956).

Biological Abstracts 32, #6686 (1958).

Biological Abstracts 33, #19770, #34152, #39148 (1959).

Biological Abstracts 34, #8706 (1959).

Biological Abstracts 35, #5933, #11726, #25356, #25359, #39599, #61123 (1960).

Biological Abstracts 36, #12249, #12251, #46468 (1961).

Biological Abstracts 37, #15807, #15809 (1962).

Biological Abstracts 38, #20346 (1962).

Biological Abstracts 43, #16871 (1963).

Biological Abstracts 45, #26352, #53192, #71018 (1964).

Chem. Abstracts 56, #9248*e* (1962).

De Bach et al.: "New Diseases of Termites Caused by Bacteria," Annals Entomological Society of America 32 (I): 137–146, March 1939.

Heimpel et al.: "Notes on the Pathogenicity of *Serratia Marcescens* Bizio for Cockroach *Blattella Germanica,*" Canad. J. Zool. 37: 169–172 (1959).

Madelin: "Diseases Caused by Hyphomycetous Fungi," pp. 233, 234, 244, 245, 246, 247, 248, 249, 250, 253, 254, 257, 258 (14 pp.) in Insect Pathology, vol 2, Steinhaus, ed., pub. 1963, by Academic Press, New York, N.Y.

Maclead: "Entomophthorales Infections," pp. 189, 190, 205, 207, 209, 210, 211, 212, 213, 214, 216, 217, 218, 219, 225 (15 pp.) in Insect Pathology, vol. 2, Steinhaus, ed., pub. 1963, by Academic Press, New York, N.Y.

Steinhaus: "Potentialities for Microbial Control of Insects," Agr. Food. Chem. 4 (8): 676–680, August 1956.

Stephens: "Note on Effects of Feeding Grasshoppers Two Pathogenic Species of Bacteria Simultaneously," Canad. J. Microbiology 5 (3): 313–315, June 1959.

Toum anoff et al.: "Les epizooties dues a *Serratia Marcescens* Bizio chez un termite," Acad. d'Agr. France, Compt. Rend. 45 (5): 216–218 (1959).

U.S.D.A. Bibliog. Agric. 23, #61409 (1959).

LEWIS GOTTS, *Primary Examiner.*

S. K. ROSE, *Assistant Examiner.*